XR 3,739,093

United States Patent 3,739,093

Kanazawa et al.

June 12, 1973

[54] DEVICE FOR REPRODUCING INFORMATION RECORDED IN A HOLOGRAM

[75] Inventors: Yasunori Kanazawa, Hachioji; Yasutsugu Takeda, Kokubunji, both of Japan

[73] Assignee: Hitachi, Ltd., Tokyo, Japan

[22] Filed: July 13, 1971

[21] Appl. No.: 162,143

[30] Foreign Application Priority Data

July 17, 1970 Japan ........................ 45/62056

[52] U.S. Cl. .......... 178/7.2, 178/5.8, 178/DIG. 28, 350/3.5

[51] Int. Cl. ........................ H04n 5/30

[58] Field of Search .................. 178/5.2 D, 5.8 R, 178/5.6, DIG. 28, 6.5, 6.7 R, 6.7 A; 350/DIG. 1, 3.5

[56] References Cited

UNITED STATES PATENTS

| | | | |
|---|---|---|---|
| 3,632,869 | 1/1972 | Bartolini et al. | 178/6.8 |
| 3,545,834 | 12/1970 | Gerritsen et al. | 350/3.5 |
| 3,189,683 | 6/1965 | Mullin | 178/5.6 |

*Primary Examiner*—Robert L. Richardson
*Attorney*—Craig, Antonelli & Hill

[57] ABSTRACT

A device for reproducing picture information and sound information which are recorded in a hologram in the overlapped manner, wherein the reproduction is performed while the hologram is continuously moved in one direction, a convex lens being used for the reproduction of the picture information while the sound information is reproduced directly from the moving hologram, whereby the picture information is reproduced at a fixed place while allowing a concurrent and continuous reproduction of the sound information.

8 Claims, 5 Drawing Figures

3739093
NO OR CLASSIF

PATENTED JUN 12 1973 3,739,093

SHEET 1 OF 2

INVENTORS

YASUNORI KANAZAWA AND
YASUTSUGU TAKEDA

BY Craig, Antonelli & Hill
ATTORNEYS

INVENTORS

YASUNORI KANAZAWA AND
YASUTSUGU TAKEDA

BY Craig, Antonelli & Hill
ATTORNEYS

DEVICE FOR REPRODUCING INFORMATION RECORDED IN A HOLOGRAM

BACKGROUND OF THE INVENTION

1. Field of the Invention

This invention relates to a device for reproducing information recorded in a film, particularly to a device for simultaneously reproducing both picture and sound informations which are recorded in a single film in the overlapped manner.

2. Description of the Prior Art

A typical conventional device sued for the simultaneous reproduction of recorded picture and sound information is the motion-picture projector using a film in which picture information is recorded by photographic techniques while sound information is carried, in the analogue manner, on the sound track in the marginal space of the film.

Another type of known device is the electronic video recording (EVR) system using a film in which picture information is written with an electron beam modulated by video signal while sound information is recorded in a coating of magnetic substance provided in the marginal space of the film.

With the devices as mentioned above, however, the recording area for information is inevitably limited, as the picture information and sound information are recorded in separate areas. As a result, the dynamic range for sound information and the signal-to-noise ratio in the reproduced sound are never satisfactory with such devices.

Recently, a system called selecta vision (SV) has been proposed, with which picture information is recorded in hologram and reproduced from it. This known system, however, relates only to picture information. If the picture information should be accompanied with sound information, a separate sound system such as a magnetic tape recorder or a phonograph must be additionally used.

In fact, there has been proposed no effective system in which both picture and sound information are recorded in a single hologram and where both can be simultaneously reproduced from it.

SUMMARY OF THE INVENTION

An object of this invention is to provide a device for concurrently reproducing both of picture information and sound information recorded in a single hologram.

Another object of this invention is to provide an information reproducing device in which picture information is reproduced at a fixed position while the information-bearing hologram is continuously moved in order to retrieve the sound information which is recorded in the same hologram.

A further object of this invention is to provide an information reproducing device in which the recording area for information is much reduced as compared with that of the conventional devices.

In order to achieve the above objects, the information reproducing device of this invention is constructed as described hereunder in connection with an embodiment of the invention and with reference to the accompanying drawings.

DESCRIPTION OF THE PREFERRED EMBODIMENT

Figures 1, 2:
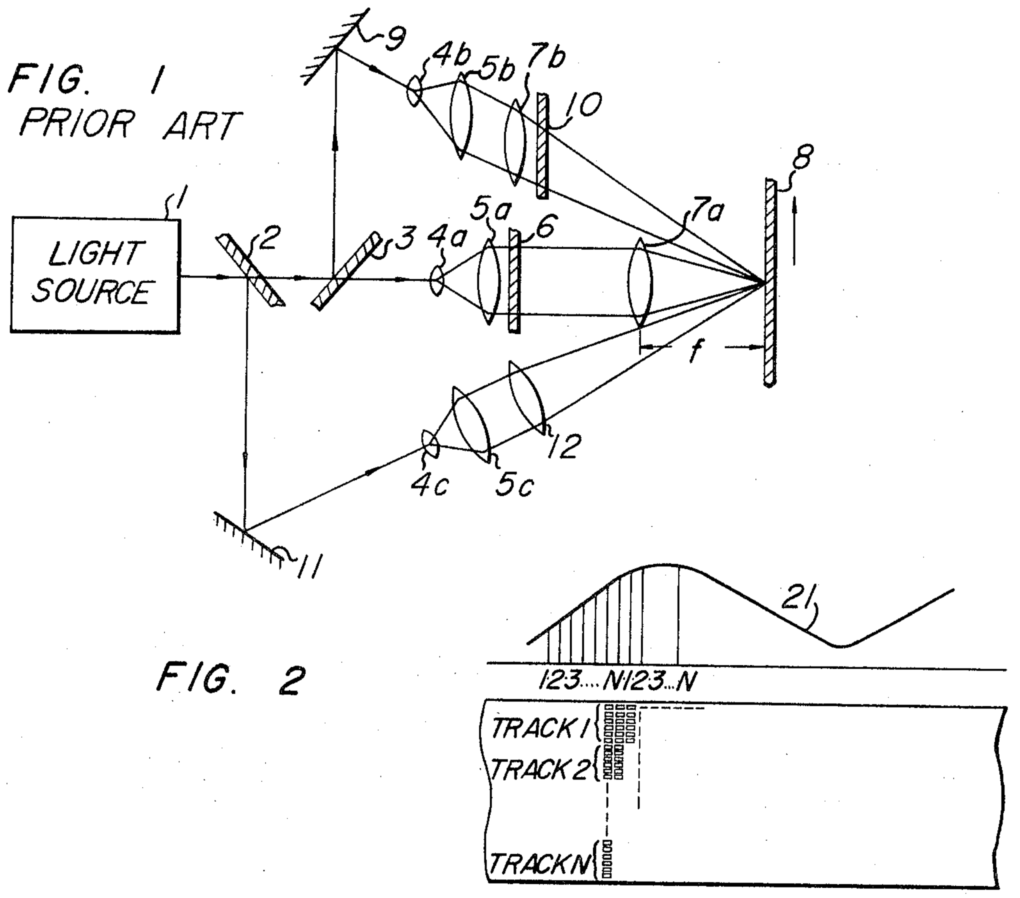
FIG. 1 is a schematic diagram of a system for recording both picture and sound information in a single hologram by the known method.
FIG. 2 is a diagram schematically showing a pattern of digitized sound information.

Referring to FIG. 1 which illustrates a method for recording both picture and sound information in a single hologram, coherent light emitted from a light source 1 which produces coherent light, for example laser light, is directed to a beam splitter or a first semi-transparent mirror 2. There, the light is split into two, one part being reflected toward a mirror 11 and the other being transmitted through the first semi-transparent mirror 2. The latter light is further divided into two by a second semi-transparent mirror 3 and one of the thus divided beams is directed to a second full-reflecting mirror 9. The remaining light beam which is transmitted through the second semi-transparent mirror 3, is spread by means of a magnifying lens *4a* and then collimated into a bundle of parallel coherent light through a collimator lens *5a*. The thus collimated coherent light is transmitted through a film 6 which bears picture information recorded thereon and is projected, as an object light, on a sensitive film 8 through a lens *7a* (referred to as a writing lens).

On the other hand, the light reflected by the second semi-transparent mirror 3 to the mirror 9 is again reflected by the mirror 9 to be directed to the sensitive film 8 through a second projection system including a magnifying lens *4b*, a collimator lens *5b* and a writing lens *7b*, in the course of which sound information recorded in another film 10 placed next to the writing lens *7b* is projected on the sensitive film 8 as an object light.

Further, the coherent light reflected by the first semi-transparent mirror 2 is again reflected by the mirror 11 and projected on the sensitive film 8 as a reference light through a third projection system including a magnifying lens *4c*, a collimator lens *5c* and a focusing lens 12. By this arrangement, the above-mentioned two object light beams and the reference light beam are caused to mutually interfere to thereby form a hologram on the sensitive film 8.

In this description, it is assumed that the sound information on the film 10 is in the form of a digital pattern into which an original analogue information has been converted by conventional techniques. It will be understood, however, that sound information of analogue pattern can be used for recording. Sound information of a digital pattern may consist of dot signals, or may be a two-dimensional disposition of coded bit information representing signals sampled from the original analogue information, as shown in FIG. 2. Namely, an analogue sound signal 21 is sampled at regular intervals, numerals 1, 2, 3 . . . , N being the sampling numbers which are repeated after every N-th sampling. The film is divided across the width into N tracks, and each of coded bit signals representing the respective sampled signals is recorded in a track whose number corresponds to the sampling number of the sampled signal.

Now, explanation is given with respect to the information reproducing device of this invention, where picture and sound information recorded in a hologram in the manner as described above are concurrently reproduced while the hologram is continuously moved in one direction.

Figure 3:
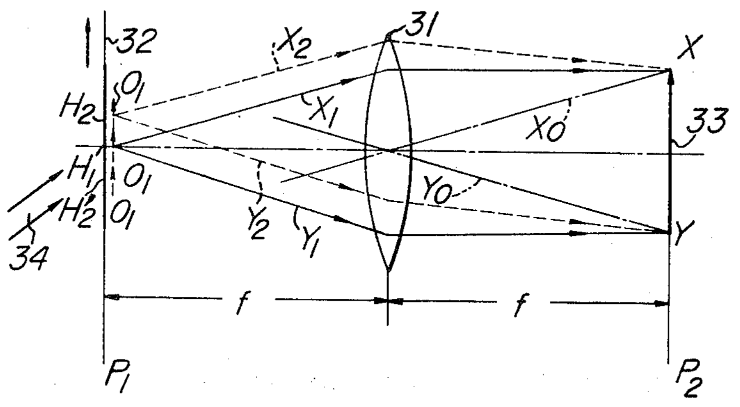
FIG. 3 is a diagram for explanation of the fundamental principle on which this invention stands.

Referring to FIG. 3 which illustrates the principle of this invention, a hologram 32 and an image plane 33 are positioned respectively at focuses $P_1$ and $P_2$ of a convex lens 31 which is provided for the purpose of unifying the position of reproduced images. Now, suppose that the hologram 32 is irradiated with a reference coherent light 34 which is projected along the same optical axis as that of the recording reference light in relation to the hologram but in the opposite direction, and that the reproduced information light beams are caused to proceed respectively in the predetermined directions. A flux of the reproduced light ($x_1- y_1$) which bears picture information of holographical image $O_1$ located at a position $H_1$ on the focal plane $P_1$, produces an optical image X – Y on the image plane or screen 33 through an image fixing or unifying lens 31. Assuming that the hologram 32 moves in the direction indicated by an arrow in FIG. 3 and as the result the image $O_1$ is displaced to a new position $H_2$, it will be clear that the new flux of light ($x_2- y_2$ ) reproduced from the image $O_1$ by the coherent reference light 34 at the new position $H_2$ is parallel with the first-mentioned flux ($x_1- y_1$) reproduced at the initial position $H_1$. It should be noted here that the sizes of the hologram $O_1$ and the reference beam 34 are extremely small as compared with the focal length $f$ of the lens 31. For example, the size of the hologram $O_1$ is the order of 1 mm square and the reference beam 34 has a sectional area of the order of 5 mm square, whereas the focal length $f$ of the lens 31 is 200 mm or so. Therefore, parallel coherent light beams $x_1$ and $x_2$, after being deflected by lens 31, intersect with an optical axis $x_o$ at a point X on the screen 33, the axis $x_o$ being a line passing through the center of the lens 31 and parallel to the beams $x_1$ and $x_2$. This fact is well known in the field of the optical technique. Similarly, parallel light beams $y_1$ and $y_2$ intersect with another optical axis $y_o$ at a point Y on the screen 33. The same is applicable to the holographical image $O_1$ located at a position $H_2'$ which is opposite to the position $H_2$ in relation to the axis of the optical system.

Thus, the reproduction XY of the holographical image $O_1$ appears at an identical position on the screen 33, so far as the image $O_1$ is within the spot of the reference light 34. Namely, even if the image $O_1$ is continuously moved, the position of the reproduced image XY on the screen 33 is maintained constantly so far as the movement of the image $O_1$ is confined within the spot of the coherent reference light 34.

Figure 4:
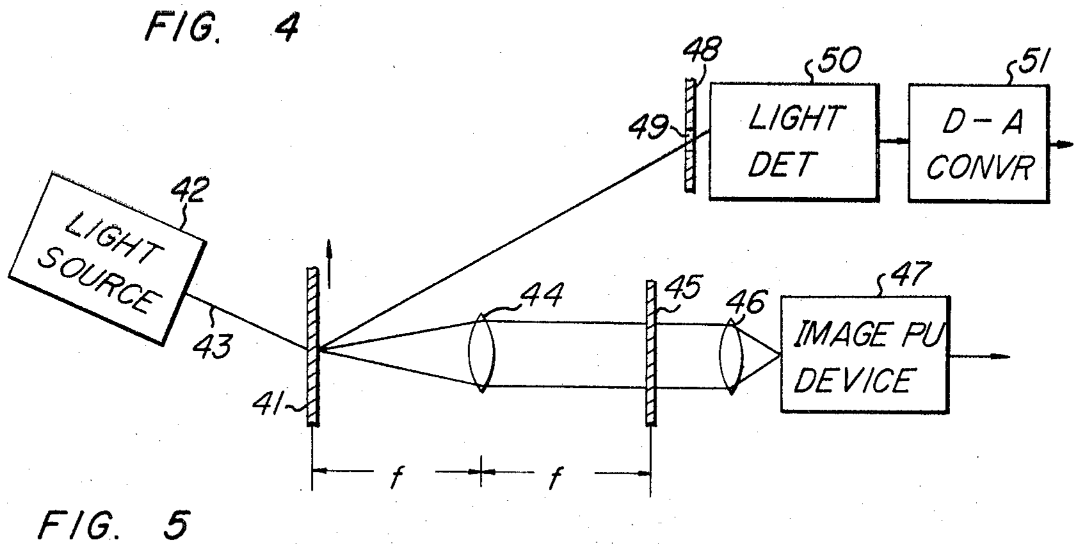
FIG. 4 is a diagram showing the constitution of an embodiment of the information reproducing device according to this invention.

Referring to FIG. 4 which schematically shows an embodiment of the reproducing device of this invention, it is assumed that a film 41 bearing a series of frames of hologram is continuously moved in the direction indicated by an arrow, each frame containing picture information and sound information recorded in overlapped manner. A light source 42 which emits coherent light such as laser beam, provides a reference light 43 for reproducing the information recorded in the film 41. The light source 42 is positioned on an optical axis which is in the point-symmetrical relationship, as regards the hologram to be irradiated, to the optical axis along which the reference coherent light has been projected at the time of recording. The picture information is reproduced from the picture component of the light which emerges from the hologram irradiated with the reference light 43, the said picture component being projected, through a lens 44, on an image plane or screen 45 placed across the optical axis of the said picture component of the retrieved light. It will be clear from the explanation presented in the preceding paragraph that the position of the reproduced picture is fixed by use of the lens 44 regardless of the shift of the film 41.

On the other hand, the sound information is retrieved from the sound component of the light emerging from the hologram irradiated with the reference light 43. The recovery of sound information is achieved by means of a photoelectric transducer without using a lens, one or more series of electric signals being successively produced as the film 41 is continuously moved in one direction, as is well known in the field of holographical technique. Namely, the sound component of the retrieved light proceeds through a slit 49 provided in a screen 48 to a detector or photoelectric transducer 50 such as a photo-transistor, photo-diode or vidicon, and there it is converted into a digital electric signal which is then converted into an analogue signal through a digital-to-analogue converter 51.

As described above, according to this invention, picture information and sound information are continuously and simultaneously reproduced from a film which bears a series of frames of holograms which contain both parts of the information recorded in the overlapped manner, the picture information being reproduced at a fixed position while the frame of hologram is continuously moved for the continuous and instantaneous reproduction of the sound information.

In the above-described reproducing operation, it may occur that the respective adjacent parts of two successive frames of the hologram come within the spot of the reference light 43 during the continuous movement of the film 41. As is well known in holographical technique, a hologram contains the whole picture information recorded at every part thereof. Therefore, a picture missing a portion thereof will never be reproduced. On the other hand, if two frames are within the spot of the reference light, the respective pictures will be concurrently reproduced. However, since pictures in two successive frames usually are very alike as in a movie film, this causes no critical problems.

The picture information reproduced on the screen 45 is picked up by a television camera 47 with the aid of a lens 46 and the electric signal from the camera 47 is transmitted through a telecasting system to be eventually displayed on the screens of television receivers. Alternatively, the picture information light retrieved from the hologram film 41 may be directly picked up with the camera 47 dispensing with the screen 45. For example, a ½ inch vidicon may be used for the television camera. In that case, the size of the image reproduced on the image screen of the vidicon may be the order of 10 mm square.

Returning to the reproduction of sound information, special consideration is required for the reproduction of the information recorded in such a manner as described in connection with FIG. 2, as all of the $n$ tracks are simultaneously picked up when the film is moved in one direction. Namely, time difference between tracks must be taken into consideration. In order to meet this requirement, each elementary signal in $n$ series of electric signals to which the retrieved information light is converted in correspondence with the respective sound informations recorded in the $n$ tracks of the film, is delayed by a time set according to the track number, and the respectively delayed elementary signals are combined into a single series of signals, which are restored to the original sound signal through a digital-to-analogue converter.

Figure 5:
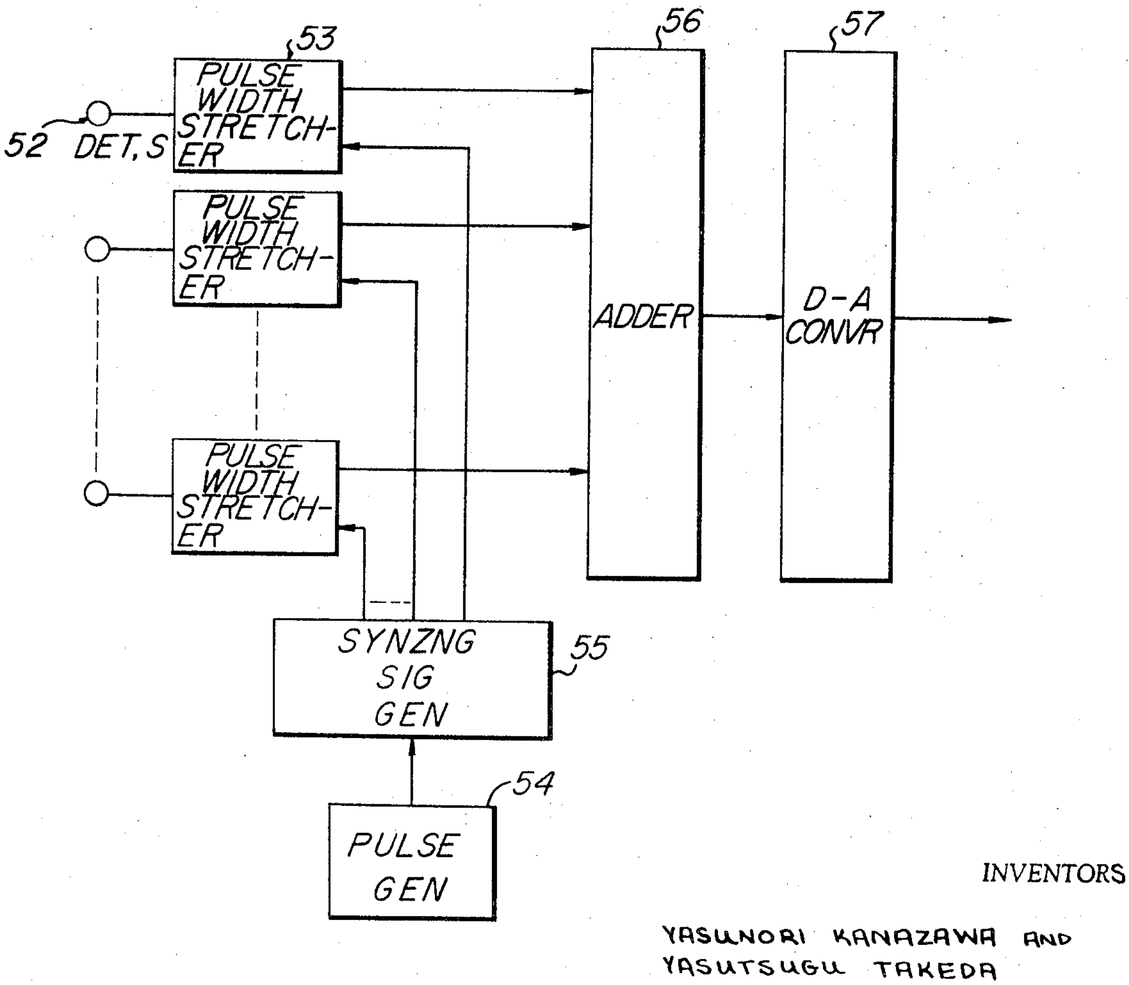
FIG. 5 is a block diagram of an embodiment of the sound information reproducing circuit of this invention.

An example of the system used for the above-described reproduction of the two-dimensionally recorded sound information are described hereunder with reference reproduction to FIG. 5. The sound information light from the hologram irradiated with the reference light which bears elementary sound information or coded sound signals recorded in a row of $n$ tracks of the film, is detected by the corresponding number ($n$) of detectors 52 provided for the respective tracks. Electric signals from each of the detectors 52 are led to each of the corresponding number of pulse width stretchers 53 to be temporarily held therein. The group of stretchers 53 are scanned with timing pulses which are supplied from a timing signal generator 55, the latter being controlled by a clock pulse generator 54. The sequential output signals from the group of stretchers 53 are successively given to an adder 56, and the output of the adder 56 is converted into an analogue signal through a digital-to-analogue converter 57. The thus obtained analogue sound signal may be transmitted through the same telecasing system as that for the picture information to be eventually reproduced in the television receivers as sound accompanying the picture. In the above example, the signals from the detectors 52 are delayed firstly and then converted into an analogue signal. However, it will be understood that as an alternative measure, the said signals may be firstly converted into analogue signals, being followed by the delaying process.

The slit 49 in the screen 48 shown in FIG. 4 serves to allow only a single row of sound information to reach the row of detectors 50. Therefore, it can be dispensed with, if the detectors consist of an array of photo-diodes or photo-transistors having an appropriate width.

As an alternative method for reproducing sound information, it is possible to reproduce it firstly as an optical image on a screen and then detect it with an image pickup tube.

As described above, this invention makes it possible to use a hologram film which contains both picture and sound information recorded in the overlapped manner, the feed and transportation of the film for reproduction being performed in substantially the same simple manner as those for the conventional projector. Further, the area of the film is reduced by the overlapped recording of both picture and sound information. Moreover, no mal-timing occurs between the reproduced picture and sound.

We claim:

1. A device for concurrently reproducing picture information and sound information which are recorded in a hologram in a completely overlapped manner, comprising: means for continuously moving the hologram in one direction; means for projecting a reference light beam on the hologram; picture reproducing means for receiving the picture component of the information light beam emitted from the hologram irradiated by the reference light beam and reproducing the picture information; lens means disposed between the hologram irradiated by the reference light beam and said picture reproducing means for projecting said picture component of the information light beam on said picture reproducing means; and sound reproducing means for receiving the sound component of said information light beam and reproducing the sound information.

2. A device as defined in claim 1, wherein said picture reproducing means comprises a screen on which the picture born by said picture component of the information light beam is displayed, means for focusing the picture displayed on said screen, and means for picking up the image focused by said focusing means.

3. A device as defined in claim 2, wherein said sound reproducing means comprises detector means for detecting the sound information born by said sound component of the information light beam and a digital-to-analogue converter for converting the output of said detector means.

4. A device as defined in claim 1, wherein said sound reproducing means comprises detector means for detecting the sound information born by said sound component of the information light beam and a digital-to-analogue converter for converting the output of said detector means.

5. A device as defined in claim 1, wherein said sound reproducing means comprises an array of a plurality of detector means adapted to receive said sound component of the information light corresponding to a row of sound information recorded on the hologram, a corresponding plurality of signal stretcher means each connected to the output of each of said plurality of detector means for temporarily holding the output signal of said detector means, pulse generating means for generating clock pulses, timing means which operates under the control of the output pulse of said pulse generating means and produces a sequence of timing pulses, means for applying each of said timing pulses to each of said signal stretcher means in predetermined order for deriving the held signal from the signal stretcher means, and digital-to-analogue converting means for converting the output pulses of said plurality of signal stretcher means to an analogue signal.

6. A device as defined in claim 5, wherein said picture reproducing means comprises a screen on which the picture born by said picture component of the information light beam is displayed, means for focusing the picture displayed on said screen, and means for picking up the image focused by said focusing means.

7. A device as defined in claim 5, wherein said digital-to-analog converter means comprises an adder circuit for combining said output pulses and a digital-analog converter circuit connected to the output of said adder circuit.

8. A device as defined in claim 1, wherein said picture producing means is an image pick up tube, on whose image screen the picture information born by said picture component of the information light beam is directed.

* * * * *